United States Patent [19]

Fleer

[11] Patent Number: 5,192,888

[45] Date of Patent: Mar. 9, 1993

[54] MOTOR TERMINAL BOX

[75] Inventor: Mark F. Fleer, Fort Wayne, Ind.

[73] Assignee: General Electric Company, Fort Wayne, Ind.

[21] Appl. No.: 759,605

[22] Filed: Sep. 13, 1991

Related U.S. Application Data

[63] Continuation of Ser. No. 543,643, Jun. 26, 1990, abandoned.

[51] Int. Cl.$^5$ .......................... H02K 5/22; H02G 3/08
[52] U.S. Cl. ...................................... 310/71; 310/89; 174/65 R
[58] Field of Search ................... 310/71, 68 R, 85, 89; 174/50, 65 R, 65 SS, 65 G, 74 R, 35 GC

[56] References Cited

U.S. PATENT DOCUMENTS

| | | | |
|---|---|---|---|
| 1,258,144 | 3/1918 | Reeve | 174/50 |
| 1,531,152 | 3/1925 | Steen | 220/3.8 |
| 1,851,572 | 3/1932 | Ehrenfeld | 310/258 |
| 1,866,344 | 7/1932 | Brown | 310/71 |
| 2,338,938 | 1/1944 | Hallett | 310/68 R |
| 2,590,559 | 3/1952 | Miller | 310/71 |
| 2,673,300 | 3/1954 | Furnas et al. | 310/71 |
| 2,878,301 | 3/1959 | Dierstein et al. | 174/50 |
| 2,916,177 | 12/1959 | Nottelmann et al. | 220/3.7 |
| 3,185,875 | 5/1965 | Harris | 310/71 |
| 3,233,129 | 2/1966 | Schaefer | 310/71 |
| 3,272,461 | 9/1966 | Larkin | 248/27.3 |
| 3,445,698 | 5/1969 | Miko | 310/71 |
| 3,518,616 | 6/1970 | Lewis | 439/470 |
| 4,047,168 | 9/1977 | Fowler | 340/310 R |
| 4,275,321 | 6/1981 | Shimamoto et al. | 310/59 |
| 4,398,400 | 8/1983 | Bar | 62/508 |
| 4,507,596 | 3/1985 | Angersbach et al. | 318/640 |
| 4,733,015 | 3/1988 | Barnes | 174/65 R |

FOREIGN PATENT DOCUMENTS

| | | | |
|---|---|---|---|
| 106990 | 3/1939 | Australia | 174/65 R |
| 853379 | 10/1970 | Canada . | |
| 3709963 | 5/1988 | Fed. Rep. of Germany | 174/65 R |
| 1092897 | 11/1954 | France . | |
| 62-250840 | 10/1987 | Japan . | |

Primary Examiner—Steven L. Stephan
Assistant Examiner—D. R. Haszko
Attorney, Agent, or Firm—Ralph E. Krisher, Jr.

[57] ABSTRACT

A terminal box for an electric motor has a base and a cover. The base has a curved bottom which conforms to the curve of a cylindrical shell or housing of the motor. The base has first and second portions to which a conduit can be attached which are at angles to each other. The base can be rotated 180° between two positions on the motor housing. A conduit can thus be run to the terminal box from any of four directions. The base is formed such that the first and second portions to which the conduit can be attached are relatively unobstructed when the cover is off. This permits wire to be pulled from the conduit through the terminal box in a relatively unobstructed path. That is, the path of the wire pull need not be angled to avoid an obstructing sidewall.

In an embodiment, the base has first and second adjacent sidewalls opposed by third and fourth sidewalls, respectively. The first and second sidewalls are relatively higher than their respective opposed third and fourth sidewalls. The first sidewall thus has a portion which is relatively unobstructed by the third sidewall which opposes it and the second sidewall has a portion which is relatively unobstructed by the fourth sidewall which opposes it. The conduit is attached to one of the first and second sidewalls at the relatively unobstructed portion thereof.

12 Claims, 4 Drawing Sheets

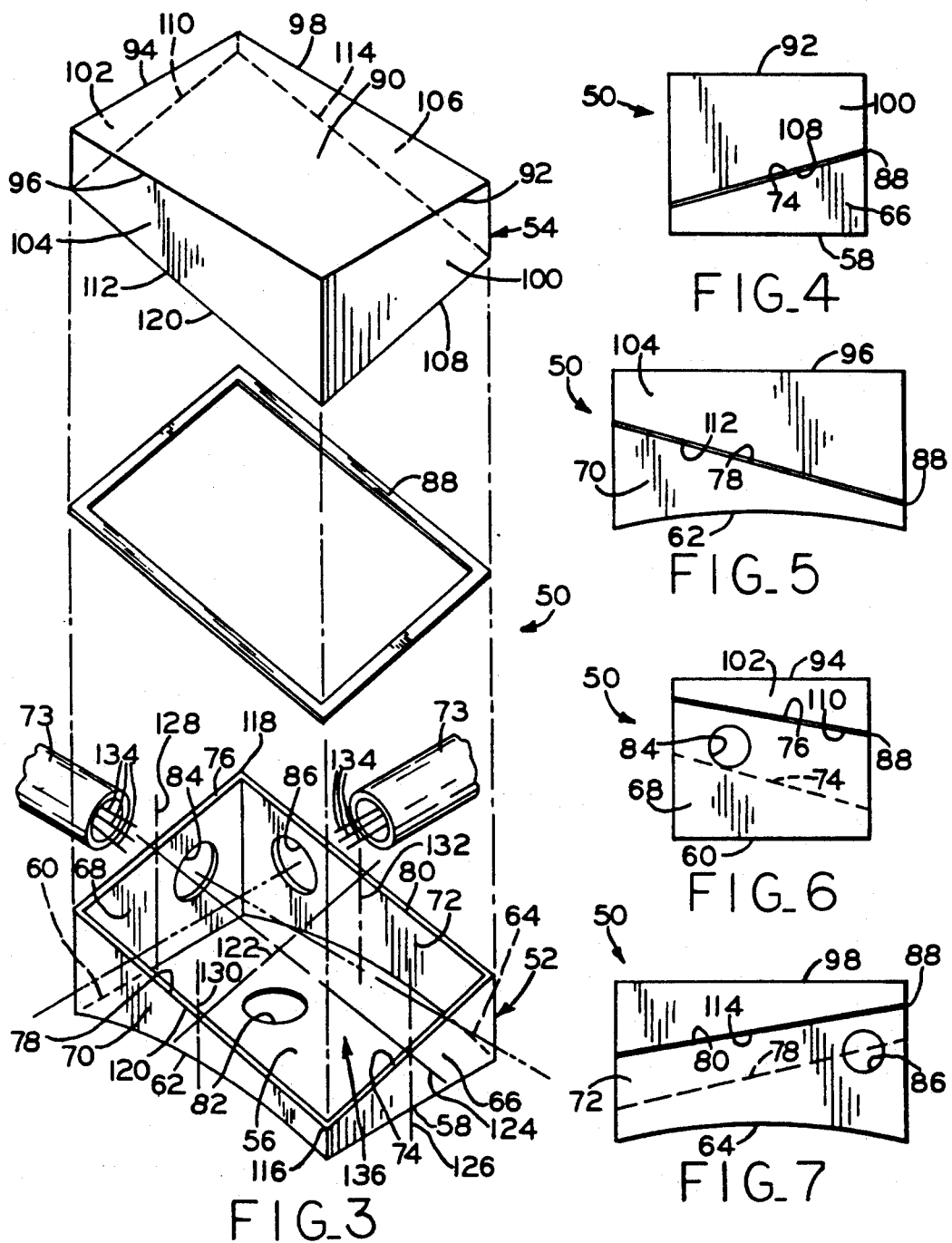

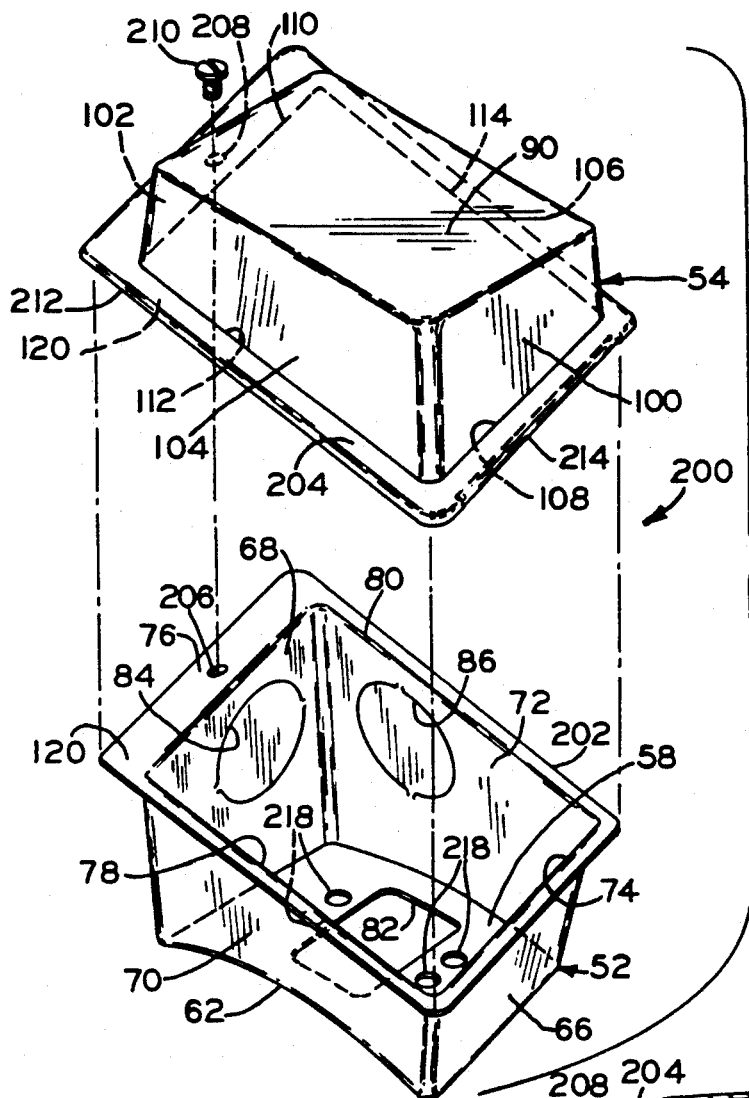
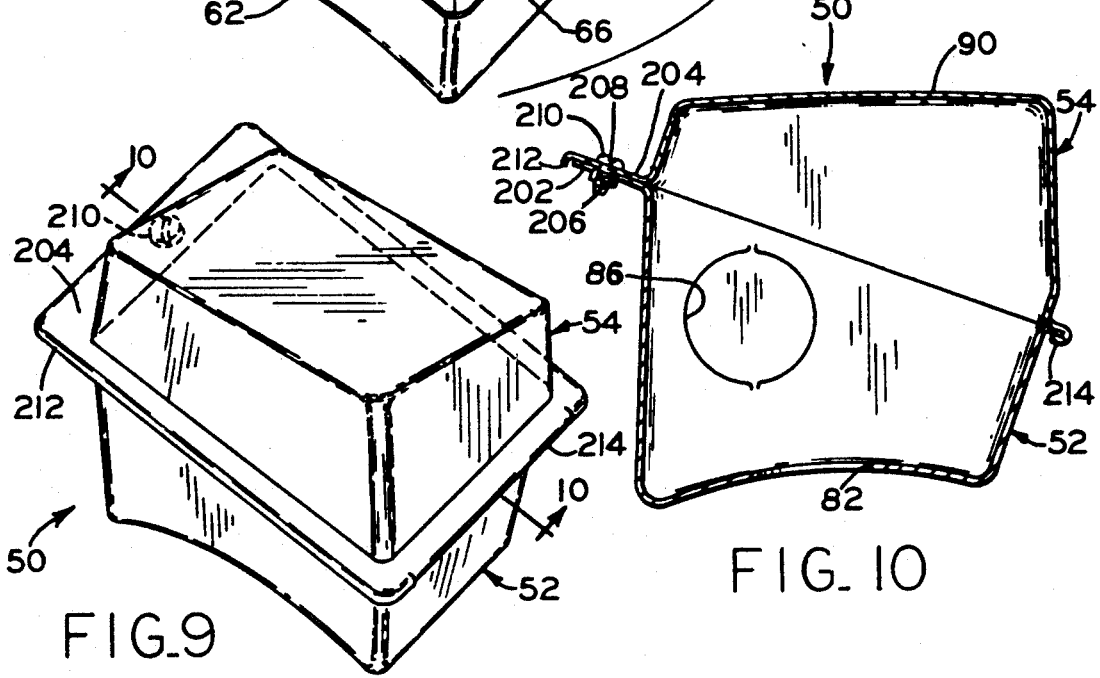

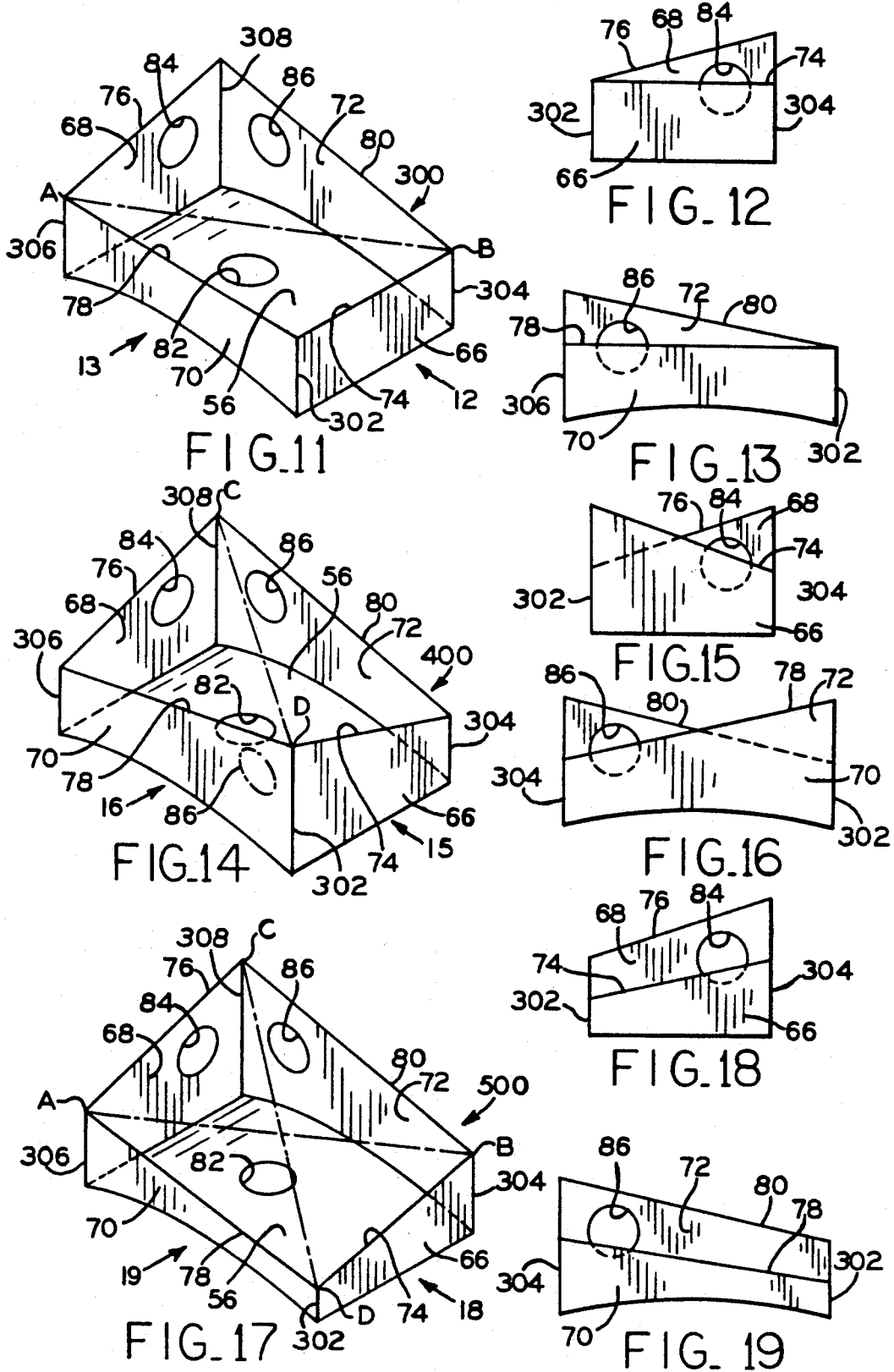

MOTOR TERMINAL BOX

This is a continuation of application Ser. No. 543,643, filed Jun. 26, 1990 now abandoned.

BACKGROUND AND SUMMARY OF THE INVENTION

This invention relates to terminal boxes and more particularly to terminal boxes which mount directly on the curved surface of a cylindrical shell of an electric motor.

Electric motors, particularly higher horsepower electrical motors of the type used to power industrial machinery, have terminal boxes which house the connections between lead wires from the motor and feed wires from a source of electricity. The feed wires are run through a conduit into the terminal box. This conduit is attached to the terminal box by a conduit fitting. In many cases, the sidewalls of the terminal box have conduit fitting openings in which a conduit fitting can be fastened. To facilitate motor installation, it is important to be able to run the conduit to the terminal box from different directions and attach it to the side of the terminal box that it approaches. In the case of a rectangular terminal box, it is desirable to be able to run the conduit to the terminal box from any of its four sides and attach it to the side of the terminal box that it approaches. This is sometimes termed 90° access.

It is also desirable that the conduit fitting opening in the sidewall of the terminal box through which the feed wires are pulled be relatively unobstructed by an opposed sidewall when the terminal box cover is open. This facilitates pulling the feed wires through the terminal box out of the conduit and conduit fitting opening of the terminal box to which the conduit is attached. A fishtape is typically used to pull wire through a conduit. The wire to be pulled is attached at one end to the fishtape. The fishtape is inserted into one end of the conduit and forced therethrough until it exits the other end of the conduit. The fishtape is then pulled to pull the wire through the conduit. Consequently, if the fishtape can be pulled from the conduit in a relatively straight line without unduly bending it, pulling wire through the conduit is made easier. If the fishtape must be bent as it exits the conduit, a more complex motion must be used to pull it as it must BEND as it exits the conduit and pulled at the same time. The terms "pulling wire", "wire pull," and the like are used herein as a short and convenient way of referring to the above process.

It is also important that an electrician who is connecting the feed wires to the motor lead wires have free access to the interior of the terminal box. This facilitates connecting the feed wires to the motor lead wires and positioning the connected wires in the terminal box.

In the past, the objectives of 90° access, an unobstructed conduit opening, and free access to the interior of the terminal box have been achieved by a split terminal box. Referring to FIG. 1, a prior split terminal box assembly 10 is shown. The terminal box assembly 10 has a split terminal box 12 and an adapter 14 to mount the terminal box 12 on a cylindrical shell or housing 9 of a motor 8 as described below.

The terminal box 12 comprises a cover 18 and a base 16. The base 16 has a square bottom 20, with a front edge 22, and three sidewalls 26, 32, 34. The bottom 20 has a hole 24 extending therethrough. Lead wires (not shown) of the motor 8 are passed into terminal box 12 through the hole 24.

The sidewall 26, which is rectangular, extends vertically upwards from a back edge 23 of the bottom 20. The rectangular sidewall 26 has a hole 30 positioned approximately in the center thereof. The hole 30 is configured to receive a conventional conduit fitting (not shown).

The sidewalls 32, 34, which are triangular, extend vertically upwardly from opposite side edges of the bottom 20 of the base 16 of the terminal box 12. Top edges 36, 38 of the opposed triangular sidewalls 32, 34, respectively, extend downwardly from a top edge 28 of the rectangular sidewall 26 to the front edge 22. The sidewalls 32, 34 are mirror images of each other.

The cover 18 is essentially the mirror image of the base 16 except that it is typically not provided with the hole 30 or the like for receiving conduit fittings. The cover 18 is secured to the base 16 by screws (not shown) or other conventional fasteners. A gasket (not shown) is usually disposed between the cover 18 and the base 16 to prevent liquids such as water or oil from getting into the terminal box 12.

The terminal box 12 is a split terminal box. The joint between the base 16 and the cover 18 forms a rectangle 47 which is defined by the junction of the front edge 22 and the top edges 28, 36, 38 of the sidewalls 26, 32, 34 of the base 16, with corresponding edges 22', 28', 36', 38' of the cover 18. The rectangle 47 defines a plane which bisects the terminal box 12 from the top edge 28 of the rectangular sidewall 26 of the base 16 to the front edge 22 of the bottom 20 of the base 16. The plane defined by the rectangle 47 is vertically perpendicular to the triangular sidewalls 32, 34. That is, a transverse axis 48 of the rectangle 47 which extends through rectangle 47 along a line parallel to the top edge 28 of sidewall 26 and the front edge 22 of the bottom 20 is perpendicular to vertical axes 45, 46 of the sidewalls 32, 34.

The adapter 14 is required to mount the terminal box 12 to the curved surface of the cylindrical shell 9. The adapter 14 has a curved bottom surface 40 and a flat top surface 42. A hole 44 positioned in the top surface 42 of the adapter 14 matches with the hole 24 in the base 16 when the base 16 is positioned on the adapter 14. The terminal box 12 is secured to the flat top surface 42 of the adapter 14 by screws or other conventional fasteners.

Illustratively, as shown, the terminal box 12 can be rotated 360° in 90° increments on adapter 14. Consequently, the hole 30 in the rectangular sidewall 26 of the base 16 of the terminal box 12 can be positioned to permit a conduit (not shown) to be run to terminal box 12 from any one of four directions 90° apart. This facilitates installation of the motor 8.

The split construction of the terminal box 12 permits easy access to the interior of the terminal box 12 and an unobstructed wire pulling path from hole 30 through the terminal box 12. When the cover 18 is removed from the base 16, the rectangular sidewall 26 of the base 16 is unobstructed by an opposed sidewall. Consequently, when an electrician is pulling the feed wires through the conduit affixed to the terminal box 12 at the hole 30 in rectangular sidewall 26, the electrician can pull the feed wires straight out of the conduit through the hole 30 without having to change the path of the wire pull. Also, since one side of the terminal box 12 is unobstructed by a sidewall, connecting the feed wires with the motor lead wires in the terminal box 12 is facilitated.

A problem with the type of terminal box such as the terminal box 12 is that the adapter 14 must be used to mount the terminal box 12 on the motor 8. This is because the bottom 20 of the base 16 of the terminal box 12 is flat to permit the terminal box 12 to be rotated 360° as described above. If the bottom 20 of the base 16 was curved, it could only be rotated 180° between two positions on the curved surface of the cylindrical shell 9. Consequently, a conduit could be run to the terminal box 12 in only two directions which are 180° apart. If a hole was provided in one of the triangular sidewalls 32, 34 to achieve 90° access, it would obstructed by the other opposed sidewall 32, 34, which would obstruct the wire pulling path.

The requirement that an adapter, for example adapter 14, be used not only adds the cost of an extra part, but it also raises the height that the terminal box 12 extends from the surface of cylindrical shell 9 of the motor 8. Since it is often desirable to minimize the height which a terminal box extends from the surface of the cylindrical shell of the motor, rectangular terminal boxes having a flat top and a curved base are often used in lieu of the above-described split terminal box because they can be mounted directly on the motor's curved surface. However, such rectangular terminal boxes, particularly those which are relatively small as are used with motors of the size typically used to power industrial equipment, do not provide an unobstructed wire pulling path. The holes which receive conduit fittings are usually positioned in the sidewalls of such rectangular terminal boxes. These holes are obstructed by opposed sidewalls. When wire or the fishtape to which the wire is attached is pulled through such a rectangular terminal box from the hole to which a conduit is attached, it must be angled upwardly to avoid the opposed sidewall. This makes it more difficult to pull wire through the conduit and the terminal box in that a more complex motion must be used to both angle and pull the wire at the same time. Also, access to such a terminal box is more restricted than the split terminal box in that access to the rectangular box is through its top.

Accordingly, there is a need for a terminal box for electric motors which can be mounted directly on the cylindrical shell of the motor without an adapter, provides 90° access to the terminal box, provides a relatively unobstructed path for pulling wire through the terminal box from the conduit attached to the terminal box, and provides free access to the interior of the terminal box.

It is an object of this invention to provide a terminal box which mounts directly on the curved surface of the cylindrical shell or housing of a motor, provides 90° access to the terminal box, provides a relatively unobstructed path for pulling wire through the terminal box from a conduit fitting opening in the terminal box, and provides free access to the interior of the terminal box when its cover is removed.

It is another object of this invention to provide a terminal box meeting the above-stated objective which can be manufactured using a relatively simple forming operation.

In carrying out the present invention in preferred forms thereof, I provide an improved terminal box comprising a base and a cover, each having four sidewalls. The base has a curved bottom which conforms to the curve of a cylindrical shell of an electric motor. The base has first and second conduit receiving means which are at angles to each other. The base can be rotated 180° between two positions on the motor housing. A conduit can thus be run to the terminal box from any of four directions. The base is formed such that the first and second conduit receiving means are relatively unobstructed when the cover is off. This permits wire to be pulled from the conduit, which is attached to one of the conduit receiving means, through the terminal box in a relatively unobstructed path. That is, the path of the wire pull need not be angled to avoid an obstructing sidewall.

In one illustrated embodiment, the base has first and second adjacent sidewalls opposed by third and fourth sidewalls, respectively. The first and second sidewalls are relatively higher than their opposed third and fourth sidewalls, respectively. The first sidewall thus has a portion which is relatively unobstructed by the third sidewall which opposes it and the second sidewall has a portion which is relatively unobstructed by the fourth sidewall which opposes it. A conduit receiving means is formed in each of the first and second sidewalls.

In a second illustrated embodiment, the first, second, third and fourth sidewalls of the base have top edges which define a plane which is not vertically perpendicular to any of the four sidewalls of the base. By having the four top edges of the base define a plane, the base structure becomes relatively simple to form such as by stamping from a piece of flat metal stock in a single operation without the need for a pre-forming operation. The cover illustratively corresponds to the base but without the conduit receiving means. The cover thus can also be manufactured using the same type of simple forming operation.

Other objects, advantages and novel features of the present invention will become apparent from the following detailed description of the invention when considered in conjunction with the accompanying drawings.

BRIEF DESCRIPTION OF THE DRAWINGS

FIG. 3 is a more detailed exploded perspective view of the terminal box of FIG. 2;

FIG. 4 is a front view of the terminal box of FIG. 3;

FIG. 5 is a side view of the terminal box of FIG. 3;

FIG. 6 is a rear view of the terminal box of FIG. 3;

FIG. 7 is a side view of the terminal box of FIG. 3 from the side opposite the side shown in FIG. 5;

FIG. 8 is an exploded perspective view of a second embodiment of a terminal box that embodies the present invention;

FIG. 9 is a perspective view of the terminal box of FIG. 10;

FIG. 10 is a section view taken along the lines 10-10 of FIG. 9;

FIG. 11 is a perspective view of a base of another embodiment of a terminal box that embodies the present invention;

FIG. 12 is a front view of the base of FIG. 11;

FIG. 13 is a side view of the base of FIG. 11;

FIG. 14 is a perspective view of a base of another embodiment of a terminal box that embodies the present invention;

FIG. 15 is a front view of the base of FIG. 14;

FIG. 16 is a side view of the base of FIG. 14;

FIG. 17 is a perspective view of a base of another embodiment of a terminal box that embodies the present invention;

FIG. 18 is a front view of the base of FIG. 17; and

FIG. 19 is a side view of the base of FIG. 17.

DETAILED DESCRIPTION OF THE DRAWINGS

Figure 1:
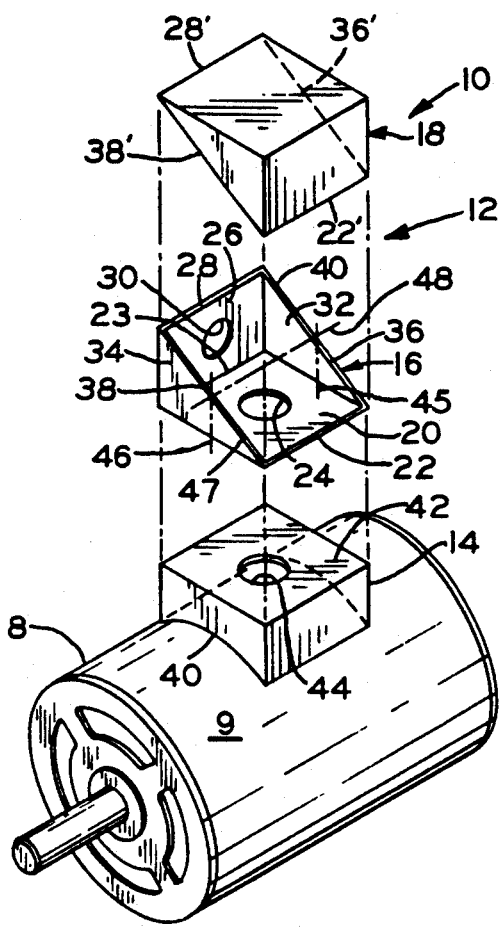
FIG. 1 is a perspective view of a prior split terminal box.

Referring to FIGS. 2-7, a terminal box 50 in combination with an electric motor is shown. Terminal box 50 comprises a base 52, a cover 54, and a gasket 88 which is sandwiched between the cover 54 and the base 52 when the cover 54 secured to the base 52.

As best shown in FIG. 3, the base 52 is generally rectangular in shape but has a curved bottom 56. The curved bottom 56 has a front edge 58, a rear edge 60, and opposed side edges 62, 64. The opposed side edges 62, 64 extend in parallel arcs from the rear edge 60 to the front edge 58 of the curved bottom 56. The curved bottom 56 is formed to conform to the cylindrical shell or housing 53 of a motor 51 (FIG. 2) on which the terminal box 50 is mounted. This permits the terminal box 50 to be mounted directly on the curved surface of the cylindrical shell 53 eliminating the need for an adapter such as the adapter 14.

The base 52 has a first trapezoidal sidewall 68 which extends vertically upwardly from the rear edge 60 of the curved bottom 56. A second generally trapezoidal sidewall 72 extends vertically upwardly from the side edge 64 of the curved bottom 56. A third trapezoidal sidewall 66 extends vertically upwardly from the front edge 58 of the curved bottom 56. A fourth generally trapezoidal sidewall 70 extends vertically upwardly from the side edge 62 of the curved bottom 56. As shown, the sidewalls 70, 72 are not true trapezoids in that their lower edges, edges 62, 64, are curved. Each sidewall 66, 68, 70, 72 has, respectively, a top edge 74, 76, 78, 80.

The base 52 also has a hole 82 positioned generally in the center of curved bottom 56. Motor lead wires 57 (FIG. 2) of the motor 51 pass into the terminal box 50 through hole 82.

The first sidewall 68 has conduit receiving means 84 formed therein for receiving a conduit 73. The second trapezoidal sidewall 72 also has conduit receiving means 86 formed therein for receiving the conduit 73. Conduit receiving means 84, 86 are illustratively shown as holes. The conduit receiving means 84, 86 could also be knock-outs for receiving a conduit fitting or could be conduit fittings affixed to the sidewalls 68, 72. The term "knock-out" conventionally means a portion of a sidewall formed so that it can be easily broken away or "knocked out" to leave an opening or hole in the sidewall for receiving a conduit fitting therein.

The cover 54, as illustratively shown, is formed so that the terminal box 50 will be generally rectangular in shape when cover 54 is in place on the base 52. The cover 54 comprises a flat rectangular top 90 having a front edge 92, a back edge 94, and opposed side edges 96, 98. A first trapezoidal sidewall 102 extends vertically downwardly from the rear edge 94 of the top 90. A second trapezoidal sidewall 106 extends vertically downwardly from the side edge 98 of the top 90. A third trapezoidal sidewall 100 extends vertically downwardly from the front edge 92 of the top 90 and a fourth trapezoidal sidewall 104 extends vertically downwardly from the side edge 96 of the top 90. Each sidewall 100, 102, 104, 106 has, respectively, a bottom edge 108, 110, 112, 114.

The junction formed when the base 52 and the cover 54 are assembled together comprises a parallelogram 120 which defines a plane which bisects the terminal box 50 from an upper rear corner 118 of the base 52 to a lower front corner 116 of the base 52. Upper rear corner 118 is at the junction of the top edges 76, 80 of the sidewalls 68, 72 of the base 52 and lower front corner 116 is at the junction of the top ed9es 74, 78 of the sidewalls 66, 70 of the base 52.

As best shown in FIG. 3, the lower front corner 116 is the lowest point on the parallelogram 120 and the upper rear corner 118 is the highest point. For purposes of convenience and clarity, the plane defined by the bottom edges 108, 110, 112, 114 of the cover 54 and the plane defined by the top edges 74, 76, 78, 80 of the base 52 will be considered to be the same plane as that defined by parallelogram 120. (The planes defined by the bottom edges 108, 110, 112, 114 of the cover 54 and the top edges 74, 76, 78, 80 of the base 52 are actually parallel to and slightly separated from one another due to the presence of the gasket 88 which is disposed between the base 52 and the cover 54).

The plane defined by the parallelogram 120 is not vertically perpendicular to any of the sidewalls 66, 68, 70, 72 of the base 52 or to any of the sidewalls 100, 102, 104, 106 of the cover 54. That is, the parallelogram 120 has a transverse axis 122 which is parallel to the top edges 74, 76 of the sidewalls 66, 68 of the base 52 and a transverse axis 124 which is parallel to the top edges 78, 80 of the sidewalls 70, 72 of the base 52. Where the transverse axes 122, 124 of the parallelogram 120 intersect vertical axes 126, 128, 130, 132 of the sidewalls 66, 68, 70, 72 of the base 52, they do so at angles which are not right angles.

As best shown in FIG. 3, the fourth sidewall 70 of the base 52 will be smaller than the second sidewall 72 opposite it and the third sidewall 66 will be smaller than the first sidewall 68 opposite it. Consequently, the conduit receiving means 84 and 86 positioned in the sidewalls 68, 72, respectively, are relatively unobstructed by the opposed sidewalls 66, 70, respectively, when the cover 54 has been removed from the base 52. This permits an electrician to easily pull feed wires 134 from the conduit 73 affixed to either the conduit receiving means 84 or the conduit receiving means 86 in a path relatively unobstructed by oppcsing sidewalls. Further, interior 136 of the terminal box 50 will be freely accessible when the cover 54 is off. At the lower front corner 116 of the base 52, access to the interior 136 of the terminal box 50 is essentially unobstructed by any sidewalls. This facilitates the connection in the terminal box 50 of the motor lead wires 57 to the feed wires 134 inside the terminal box 50.

The structure of the terminal box 50 facilitates the manufacture not only of the base 52 and the cover 54 of the terminal box 50 but also of the gasket 88. The top edges 74, 76, 78, 80 of the base 52 define a plane as do the bottom edges 108, 110, 112, 114 of the cover 54. This allows the die and pressure plates of the tooling used to form base 52 and cover 54 of the terminal box 50 to be relatively simple parts. Further, the feedstock from which the cover 54 and the base 52 are formed can be flat stock and need not be pre-formed to a non-planar shape prior to the final forming of the base 52 and the cover 54. The gasket 88 can be a simple planar structure and can be formed from a flat sheet of material.

The terminal box 50 facilitates the installation of the motor 51. The conduit 73 can be run to the terminal box 50 from any one of its four sides. Although the terminal box 50 can only be rotated 180° between two positions, the utilization of the two conduit receiving means 84, 86 in the adjacent sidewalls 68, 72, provides 90° access to the terminal box 50.

FIGS. 8-10 illustrate a second embodiment of a representative terminal box 200 of this invention. The base 52 and the cover 54 of the terminal box 200 are formed according to the principles just described with respect to the terminal box 50 of FIGS. 2-7. The same reference numerals will be used to identify like elements of the terminal box 200 and the terminal box 50. Further, the description of the terminal box 200 will focus on those elements which are different than or in addition to the elements of the terminal box 50.

The terminal box 200 also comprises the base 52 and the cover 54. The base 52 has a perimetral flange 202 which extends around and projects outwardly from the top edges 74, 76, 78, 80 of the sidewalls 66, 68, 70, 72 of the base 52. The cover 54 has a corresponding perimetral flange 204 which extends around and projects outwardly from the bottom edges 108, 110, 112, 114 of the sidewalls 100, 102, 104, 106, of the cover 54 and which mates with the perimetral flange 202 of base 52 when terminal box 200 is closed.

The portions of the perimetral flange 204 of the cover 54 which extend along the bottom edges 110, 112, 114, of the sidewalls 102, 104, 106, of the cover 54 have a lip 212 which projects downwardly from an outer edge of the flange 204 as best shown in FIG. 10. The portion of the flange 204 which extends along the bottom edge 108 of the sidewall 100 of the cover 54 has a lip which curves downwardly and inwardly from an outer edge of the flange 204 to form a slotted hinge 214. As can best be seen in FIG. 10, when the cover 54 is in place on the base 52, the slotted hinge 214 of the flange 204 of the cover 54 slips over the portion of the flange 202 of the base 52 which extends along the top edge 74 of the sidewall 66 of the base 52. The lip 212 of the flange 204 extends down around the outer edges of the portions of the flange 202 of the base 52 which extends along the top edges 76, 78, 80, of the sidewalls 68, 70, 72, of the base 52.

A portion of the perimetral flange 202 which extends along the top edge 76 of the sidewall 68 of the base 52 has a threaded hole 206 formed therein. A portion of the flange 204 which extends along the bottom edge 110 of the sidewall 102 of the cover 54 has a corresponding hole 208 formed therein. As best shown in FIG. 10, a screw 210 is inserted through the hole 208 in the flange 204 of the cover 54 and tightened into the threaded hole 206 in the flange 202 of the base 52 to secure the cover 54 to the base 52.

Figure 2:
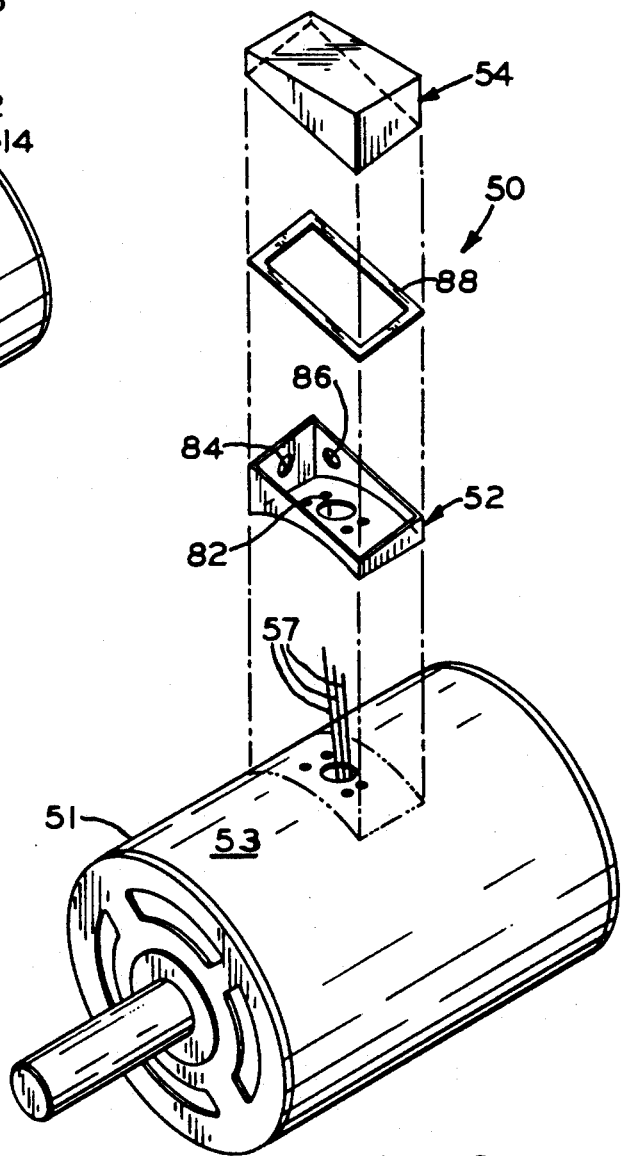
FIG. 2 is an exploded perspective view of a terminal box that embodies this invention in one form thereof.

As best shown in FIG. 8, the hole 82 in the bottom 58 of the base 52 of the terminal box 200 is rectangular. The bottom 56 of the base 52 also has a plurality of screw holes 218 through which screws (not shown) can be inserted to secure the base 52 to the cylindrical shell 53 of the motor 51 (FIG. 2). The terminal box 200 could also include a gasket (not shown) such as the gasket 88 (FIG. 3) between the cover 54 and the base 52.

Referring to FIGS. 11-13, another illustrated embodiment of a representative terminal box of this invention is shown. For purposes of brevity, only a base 300 of the terminal box is shown, it being understood that the terminal box also includes a cover. The reference numerals used above to identify elements of the base 52 in FIGS. 3-7 will be used to identify corresponding elements in FIGS. 11-13.

The base 300 has first, second, third, and fourth sidewalls 66, 68, 70, 72 although these sidewalls are not identical in shape to the corresponding sidewalls of the base 52 in FIGS. 3-7 as will be apparent from the following discussion. The sidewalls 66, 68, 70, 72 have top edges 74, 76, 78, 80, respectively. The base 300 also has conduit receiving means 84 formed in the sidewall 68 and conduit receiving means 86 formed in the sidewall 72. The bottom 56 of the base 300 includes a hole 82 positioned generally in the center thereof through which the motor lead wires 57 (FIG. 2) of the motor 51 pass into the terminal box of which the base 300 is a part.

As oriented in FIG. 11, the base 300 has a left front corner 302 at the 1unction of the sidewalls 66, 70, a right front corner 304 at the junction of the sidewalls 66, 72, a left rear corner 306 at the junction of the sidewalls 68, 70, and a right rear corner 308 at the junction of the sidewalls 68, 72. The base 300 is formed so that the corners 302, 304, 306 are all the same or nearly the same height and the corner 308 is higher than the corners 302, 304, 306. The top edges 76, 80 of the sidewalls 68, 72, respectively, slant upwardly from the corners 306, 304, respectively, to the corner 308 and define a plane which slants downwardly from the top of the corner 308 and intersects a horizontal plane defined by the top edges 74, 78, of the sidewalls 66, 70, respectively, along a line A-B.

As best shown in FIGS. 12 and 13, at least a portion of the conduit receiving means 84 in the sidewall 68 is unobstructed by the opposing sidewall 66 and at least a portion of the conduit receiving means 86 in the sidewall 72 is unobstructed by opposing sidewall 70. This permits the feed wires 134 (FIG. 3) to be pulled out of the conduit receiving means 84 or 86 in a path relatively unobstructed by opposing sidewalls.

Referring to FIGS. 14-16, another illustrated embodiment of a representative terminal box of this invention is shown. For purposes of brevity, only a base 400 of the terminal box is shown, it being understood that the terminal box also includes a cover. The reference numerals used above to identify elements of base 300 in FIGS. 11-13 will be used to identify corresponding elements in FIGS. 14-16.

The base 400 has first, second, third, and fourth sidewalls 66, 68, 70, 72 although these sidewalls are not identical in 10 shape to the corresponding sidewalls of base 300 in FIGS. 11-13 as will be apparent from the following discussion. The sidewalls 66, 68, 70, 72 have top edges 74, 76, 78, 80, respectively. The base 400 also has conduit receiving means 84 formed in the sidewall 68 and conduit receiving means 86 formed in the sidewall 72. The bottom 56 of the base 400 includes a hole 82 positioned generally in the center thereof through which the motor lead wires 57 (FIG. 2) of the motor 51 pass into the terminal box of which base 400 is a part.

As oriented in FIG. 14, the base 400 has a left front corner 302 at the junction of the sidewalls 66, 70, a right front corner 304 at the junction of the sidewalls 66, 72, a left rear corner 306 at the junction of the sidewalls 68, 70, and a right rear corner 308 at the junction of the sidewalls 68, 72. The base 400 is formed so that the corners 302 and 308 are the same or nearly the same height as are the corners 304, 306, with the height of the corners 304, 306 being less than the height of the corners 302, 308. The top edges 74, 80 of the sidewalls 66, 72, respectively, extend upwardly from the corner 304 to the corners 302, 308, respectively. The top edges 76, 78 of the sidewalls 68, 70, respectively, extend upwardly from the corner 306 to the corners 308, 302, respectively. The top edges 76, 78 define a plane which slants upwardly from the top of the corner 306 and intersects a plane defined by the top edges 74, 80, which slants upwardly from the top of the corner 304, along a line C-D.

As best shown in FIGS. 15 and 16, at least a portion of the conduit receiving means 84 in the sidewall 68 is unobstructed by the opposing sidewall 66 and at least a portion of the conduit receiving means 86 in the sidewall 72 is unobstructed by the opposing sidewall 70. This permits the feed wires 134 (FIG. 3) to be pulled out of the conduit receiving means 84 or 86 in a path relatively unobstructed by opposing sidewalls. Alternatively, as shown in phantom in FIG. 14, conduit receiving means 86 could be formed in a portion of sidewall 70 that is relatively unobstructed by sidewall 72.

Referring to FIGS. 17-19, another illustrated embodiment of a representative terminal box of this invention is shown. For purposes of brevity, only a base 500 of the terminal box is shown, it being understood that the terminal box also includes a cover. The reference numerals used above to identify elements of base 300 in FIGS. 11-13 will be used to identify corresponding elements in FIGS. 17-19.

Base 500 has first, second, third, and fourth sidewalls 66, 68, 70, 72 although these sidewalls are not identical in shape to the corresponding sidewalls of base 300 in FIGS. 11-13 as will be apparent from the following discussion. The sidewalls 66, 68, 70, 72 have top edges 74, 76, 78, 80, respectively. The base 500 also has conduit receiving means 84 formed in the sidewall 68 and conduit receiving means 86 formed in the sidewall 72. The bottom 56 of the base 500 includes a hole 82 positioned generally in the center thereof through which the motor lead wires 57 (FIG. 2) of the motor 51 pass into the terminal box of which base 400 is a part.

As oriented in FIG. 17, the base 500 has a left front corner 302 at the junction of the sidewalls 66, 70, a right front corner 304 at the junction of the sidewalls 66, 72, a left rear corner 306 at the junction of the sidewalls 68, 70, and a right rear corner 308 at the junction of the sidewalls 68, 72. The base 500 is formed so that the corners 304 and 306 are the same or nearly the same height which is greater than the height of the corner 302 and less than the height of corner 308. The top edges 74, 78 of the sidewalls 66, 70, respectively, extend upwardly from the corner 302 to the corners 304, 306, respectively. The top edges 76, 80 of the sidewalls 68, 72, respectively, extend upwardly from the corners 306, 304, respectively, to the corner 308. The top edges 74, 78 define a plane which slants upwardly from the top of the corner 302 and intersects a plane defined by the top edges 76, 80, which slants downwardly from the top of the corner 308, along a line A-B. The top edges 76, 78 define a plane that intersects a plane defined by the top edges 74, 80 along a line C-D. It should be understood that base 52 of FIGS. 3-7 is a specific example of base 500. That is, the heights of the corners 302, 304, 306, 308 can be selected so that the top edges 74, 76, 78 80 define a single plane.

As best shown ir FIGS. 18 and 19, at least a portion of the conduit receiving means 84 in the sidewall 68 is unobstructed by the opposing sidewall 66 and at least a portion of the conduit receiving means 86 in the sidewall 72 is unobstructed by the opposing sidewall 70. This permits the feed wires 134 (FIG. 3) to be pulled out of the conduit receiving means 84 or 86 in a path relatively unobstructed by opposing sidewalls.

Although the invention has been described in detail with reference to certain preferred embodiments and specific examples, variations and modifications exist within the scope and spirit of the invention as described and as defined in the following claims.

What is claimed is:

1. A generally rectangular terminal box for mounting directly on a generally cylindrical surface segment of an electric motor housing, the terminal box comprising a one piece base and a cover, the base having a curved bottom surface preselectively contoured to conform to the curved surface of the electric motor housing and also having a wire accommodating opening therein, and further having four sidewalls including first and second intersecting sidewalls respectively having first and second means for receiving conduit feedwires, the sidewalls of the terminal box being dimensioned and shaped so that at least a portion of each of the first and second conduit feedwire receiving means is substantially unobstructed by any sidewall of the terminal box base when the cover is removed to thereby permit feedwires to be pulled in an essentially unobstructured path through terminal box feedwire receiving means.

2. The terminal box of claim 1 wherein each of said intersecting sidewalls is generally trapezoidal in shape and has one of the first and second conduit receiving means formed therein, and wherein the terminal box can be mounted in at least two positions on the curved surface of the motor housing to permit the conduit to be run to the terminal box from different directions.

3. The terminal box of claim 2 wherein the intersecting sidewalls are perpendicular to each other to permit 90 degree access to the terminal box.

4. A terminal box for mounting directly on the curved surface of an electric motor housing and providing 90 degree access to the terminal box for running a conduit to the terminal box and permitting wire run through the conduit into the terminal box to be pulled through the terminal box from the conduit along an essentially unobstructed path, the terminal box comprising a one piece base having a curved bottom surface adapted to conform to the curved surface of the electric motor housing, and having four sidewalls that include first and second intersecting sidewalls having means formed therein for receiving a conduit, and a cover having four sidewalls which mates to the base, the junction of the cover and the base defining a junction plane such that when the cover is removed from the base, portions of the intersecting sidewalls having the conduit receiving means therein are substantially unobstructed by opposing sidewalls of the terminal box.

5. A terminal box for mounting directly on the curved surface of an electric motor housing and providing 90 degree access to the terminal box for running a conduit to the terminal box and permitting wire run through the conduit into the terminal box to be pulled through the terminal box from the conduit along an essentially unobstructed path, the terminal box comprising a base having a curved bottom surface adapted to conform to the curved surface of the electric motor housing, and having first and second intersecting sidewalls, and a cover which mates to the base, the junction of the cover and the base defining a junction plane such that when he cover is removed from the base, portions of the intersecting sidewalls are substantially unobstructed by opposing sidewalls of the terminal box, the first and second intersecting sidewalls each having means formed therein for receiving a conduit; said base further comprising third and fourth sidewalls on sides opposite to the first and second sidewalls, respectively, the third sidewall being shorter than the first sidewall and the fourth sidewall being shorter than the second sidewall such that said portions of the first and second sidewalls are substantially unobstructed by the third and fourth sidewalls, respectively.

6. The terminal box of claim 5 wherein the junction plane defined by the junction of the cover and the base of the terminal box is non-perpendicular to any of the first, second, third or fourth sidewalls of the base.

7. A terminal box for mounting directly on the curved surface of an electric motor housing, comprising a base and a cover, the base having a curved bottom for directly mounting on the curved surface of the motor housing, the base having first and second adjacent sidewalls and third and fourth adjacent sidewalls opposite the first and second sidewalls, respectively, wherein the first and second sidewalls are higher than their opposed third and fourth sidewalls, respectively, so that a portion of the first sidewall is substantially unobstructed by the third sidewall and a portion of the second sidewall is substantially unobstructured by the fourth sidewall; the first and second sidewalls each having means for receiving a conduit formed in their unobstructed portions so that at least a portion of each conduit receiving means is substantially unobstructed by an opposing sidewall to permit wire to be pulled in an essentially unobstructed path through the terminal box from one of the conduit receiving means, the terminal box being mountable to the surface of the motor housing in different positions to permit conduit to be run to the terminal box from different directions.

8. The terminal box of claim 7 wherein the first, second, third and fourth sidewalls have top edges which lie in substantially the same plane.

9. The terminal box of claim 8 wherein said plane is non-perpendicular to any of the first, second, third or fourth sidewalls.

10. An electric motor comprising a cylindrical housing and a terminal box for mounting directly on a curved surface of the cylindrical housing, the terminal box comprising a base and a cover, the base having a curved bottom for directly mounting on the curved surface of the motor housing, the base having first and second adjacent sidewalls and third and fourth adjacent sidewalls opposite the first and second sidewalls, respectively, wherein the first and second sidewalls are higher than their opposed third and fourth sidewalls, respectively, so that a portion of the first sidewall is substantially unobstructed by the third sidewall and a portion of the second sidewall is substantially unobstructed by the fourth sidewall, the first and second sidewalls each having means for receiving a conduit formed in the substantially unobstructed portions to permit wire to be pulled in an essentially unobstructed path through the terminal box from one of the conduit receiving means, the terminal box being mountable to the surface of the motor housing in different positions to permit conduit to be run to the terminal box from four different directions.

11. The electric motor of claim 10 wherein the first, second, third and fourth sidewalls of the base of the terminal box have top edges which lie in substantially the same plane.

12. The electric motor of claim 11 wherein said plane is non-perpendicular to any of the first, second, third or fourth sidewalls of the base of the terminal box, and wherein the sidewalls are generally trapezoidal.

* * * * *